(12) United States Patent
Hake et al.

(10) Patent No.: US 8,439,324 B2
(45) Date of Patent: May 14, 2013

(54) ADJUSTING DEVICE, IN PARTICULAR FOR THE SEAT OF A MOTOR VEHICLE

(75) Inventors: Ernst-Jürgen Hake, Radevormwald (DE); Bernd Engels, Remscheid (DE); Martin Zynda, Burscheid (DE)

(73) Assignee: Johnson Controls GmbH, Burscheid (DE)

( * ) Notice: Subject to any disclaimer, the term of this patent is extended or adjusted under 35 U.S.C. 154(b) by 1369 days.

(21) Appl. No.: 11/574,800

(22) PCT Filed: Aug. 6, 2005

(86) PCT No.: PCT/EP2005/008549
§ 371 (c)(1),
(2), (4) Date: Feb. 4, 2008

(87) PCT Pub. No.: WO2006/027066
PCT Pub. Date: Mar. 16, 2006

(65) Prior Publication Data
US 2009/0195042 A1 Aug. 6, 2009

(30) Foreign Application Priority Data
Sep. 7, 2004 (DE) .......................... 10 2004 043 630

(51) Int. Cl.
*F16M 13/00* (2006.01)
(52) U.S. Cl.
USPC .......................................... 248/429; 248/424
(58) Field of Classification Search .................. 248/424, 248/429, 430; 297/344.11, 344.2, 311, 312; 296/65.01, 65.13, 65.14
See application file for complete search history.

(56) References Cited

U.S. PATENT DOCUMENTS

| 4,802,374 | A | | 2/1989 | Hamelin et al. | |
|---|---|---|---|---|---|
| 5,048,886 | A | * | 9/1991 | Ito et al. | 296/65.14 |
| 5,445,354 | A | | 8/1995 | Gauger et al. | |
| 6,948,693 | B2 | * | 9/2005 | Goodbred | 248/429 |
| 6,971,620 | B2 | * | 12/2005 | Moradell et al. | 248/422 |
| 7,073,764 | B2 | * | 7/2006 | Matsushiro | 248/424 |
| 7,198,243 | B2 | * | 4/2007 | Hofschulte et al. | 248/429 |

FOREIGN PATENT DOCUMENTS

| DE | 17 55 740 | | 1/1972 |
|---|---|---|---|
| DE | 198 61 100 | A1 | 2/2000 |
| DE | 102 30 514 | A1 | 1/2004 |
| DE | 101 39 631 | A1 | 3/2006 |
| DE | 10 2004 043 630 | A1 | 3/2006 |
| EP | 0 277 069 | A | 8/1988 |

(Continued)

OTHER PUBLICATIONS

JP Office Action, 2007-529324, 2 pages.

*Primary Examiner* — Alfred J Wujciak
(74) *Attorney, Agent, or Firm* — Foley & Lardner LLP

(57) ABSTRACT

The invention relates to an adjusting device, in particular for the seat of a motor vehicle, comprising at least one first rail (lower rail (1)) and one second rail (upper rail 2)) which is embodied in a displaceable manner in relation to the first rail, in addition to a spindle (4) which is connected to the first rail and a drive housing (14) which can be penetrated by the spindle and which is arranged on the second rail, said drive housing being provided in order to receive at least one gear element which co-operates with the spindle. According to the invention, the drive housing is secured in a directly positive manner to the associated rail but also in a manner whereby the height can be adjusted.

9 Claims, 6 Drawing Sheets

FOREIGN PATENT DOCUMENTS

Figure 1:
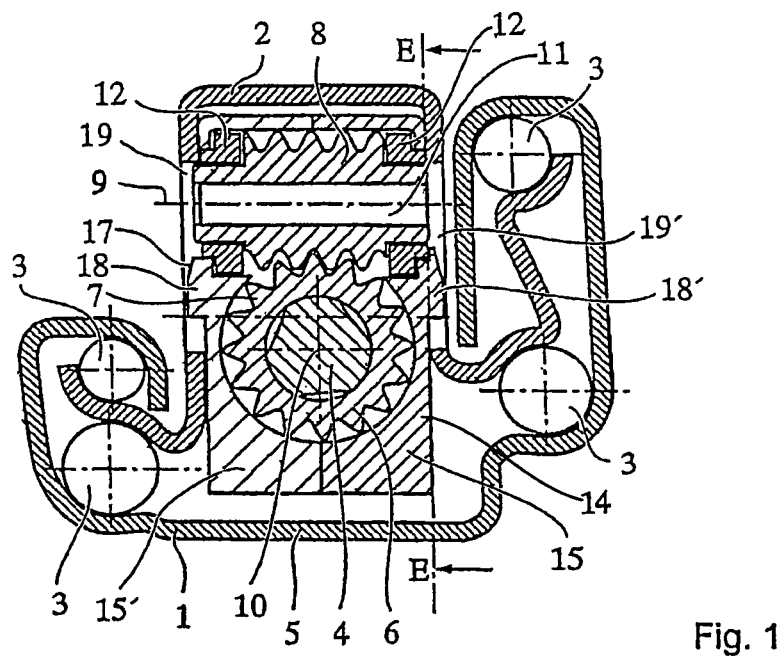

| | | |
|---|---|---|
| JP | 56-007723 A | 1/1981 |
| JP | 63-500609 | 3/1988 |
| JP | 11-129790 A | 5/1999 |
| JP | 2003-320873 | 11/2003 |
| JP | 2004-210113 A | 7/2004 |
| WO | WO-02/070299 A1 | 9/2002 |
| WO | WO 2004/005066 A | 1/2004 |

* cited by examiner

ADJUSTING DEVICE, IN PARTICULAR FOR THE SEAT OF A MOTOR VEHICLE

The present application is a National Phase Application of PCT/EP2005/008549 filed Aug. 6, 2005 and published as WO 2006/027066 A1 on Mar. 16, 2006, and which claims priority to German Patent Application No. 10 2004 043 630.4 filed Sep. 7, 2004, all aforementioned applications being incorporated herein by reference in their entireties.

The invention relates to an adjusting device, in particular for the seat of a motor vehicle, with at least one first rail and one second rail, which is designed to be displaceable in relation to the first rail, with a spindle connected to the first rail, and with a gear housing, which is arranged on the second rail, is penetrated by the spindle and is provided for receiving at least one gear element which acts together with the spindle.

PRIOR ART

An adjusting device of the generic type for the longitudinal adjustment of a motor vehicle seat is known from laid-open specification DE 1 755 740. It comprises two parallel sliding rails which are on the seat and slide into guide rails fastened to the vehicle floor. Threaded spindles are fastened rigidly laterally to the sliding rails while gear housings, which receive rotatable threaded nuts and the driving means thereof, are arranged on the guide rails. The gear housings each comprise a gear block, which directly receives the rotatable components and is composed of two plastic segments screwed to each other. The gear block is mounted, with the insertion of a damping, elastic lining, in a metal pocket, which is fastened to the guide rail, in such a manner that it can be displaced in a plane perpendicular to the longitudinal direction of the spindle and can compensate for differences in parallelism and height differences.

A construction of this type has the drawback of exposed spindles which may cause soiling or even injuries. Furthermore, this adjusting device requires a considerable amount of space.

The publication DE 198 61 100 A1 describes an adjusting device which is likewise of the generic type and in which the gear housing comprises a plurality of plates, which are inserted into one another, receive the rotatable components and are partially clasped by a U-shaped holder. The holder is fastened to the seat rail, with decoupling elements being arranged between the holder and the gear housing in such a manner that tolerances are compensated for and noises decoupled. The spindle penetrates both the U-shaped holder in the region of both limbs and the gear housing. Spindle, gear housing and holder are arranged within the pair of rails and are therefore accommodated in a space-saving and protected manner.

By contrast, the complicated fixing of the gear housing on the upper rail is a drawback.

Problem

The invention is based on the problem of providing an adjusting device with a gear housing which can be fitted simply and securely.

Solution

The problem is solved in a device of the generic type in that the gear housing is fastened directly with a form fit to the associated rail.

In this case, the spindle is arranged on the bottom rail of the motor vehicle seat preferably in a manner fixed with respect to rotation and shearing force while the gear housing, in which a spindle nut which can be driven via a worm gear can be arranged, is embedded into the seat rail in a manner fixed with respect to shearing force in the longitudinal direction of the rail, but such that it can be displaced vertically. The displacement compensates for height tolerances between spindle and gear housing.

The second rail advantageously has at least one preferably vertical limb with latching means into which the gear housing can be inserted. The latching means can comprise a plurality of latching openings which are spaced apart from one another in the longitudinal direction of the rail and into which latching projections, which are integrally formed as a single piece on the gear housing or are embedded separately, can be inserted.

Particularly favorable is an arrangement, in which the latching openings are arranged on mutually opposite limbs of the second rail, which at least in part has a U-shaped profile, which limbs run essentially parallel to each other. The gear housing can be clamped between the limbs of the rail with little prestress, with the latching projections, which protrude to both sides, penetrating the mutually opposite latching openings. The gear housing is fastened in a manner fixed with respect to shearing force by, as seen in the longitudinal direction of the rail, the width of the latching projections approximately corresponding to the width of the latching openings. However, the latching openings advantageously have a greater height than the latching projections in order to enable the previously described vertical displacement of the gear housing in the rail.

Furthermore, the latching projections of the gear housing can have entry slopes facilitating the insertion into the latching openings. Depending on the installation situation and the materials used, a spreading of the rail during the assembly of the gear housing can be omitted.

According to a particular development of the invention, the gear housing has a division running through the retainer of the spindle. During assembly, the gear elements are placed into the divided housing which is subsequently closed and fitted into the rail. If assembly of the gear and installation into the rail do not follow each other directly, it is expedient to connect the housing halves directly to each other at least temporarily.

Alternatively, the gear housing can be designed as a single piece. In this case, it has a shaft which runs from the outside into the region of the spindle retainer and into which the gear element, which acts together with the spindle, can be inserted. If this shaft ends in the gear housing in the manner of a blind hole, the spindle nut, which is provided with an external toothing, and a driving worm, which sets the latter rotating, including its bearing bushings are embedded successively or together into the shaft with the desired orientation. The installation parts are secured in their design position at the latest after the gear housing is inserted into the associated rail.

FIGURES

Figure 2:
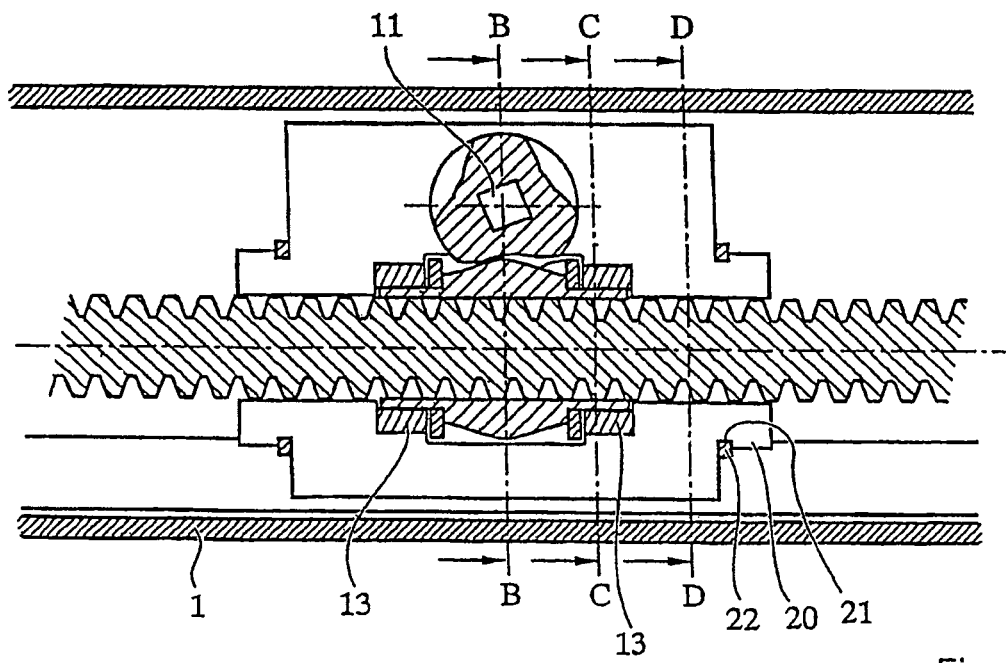
Figure 3:
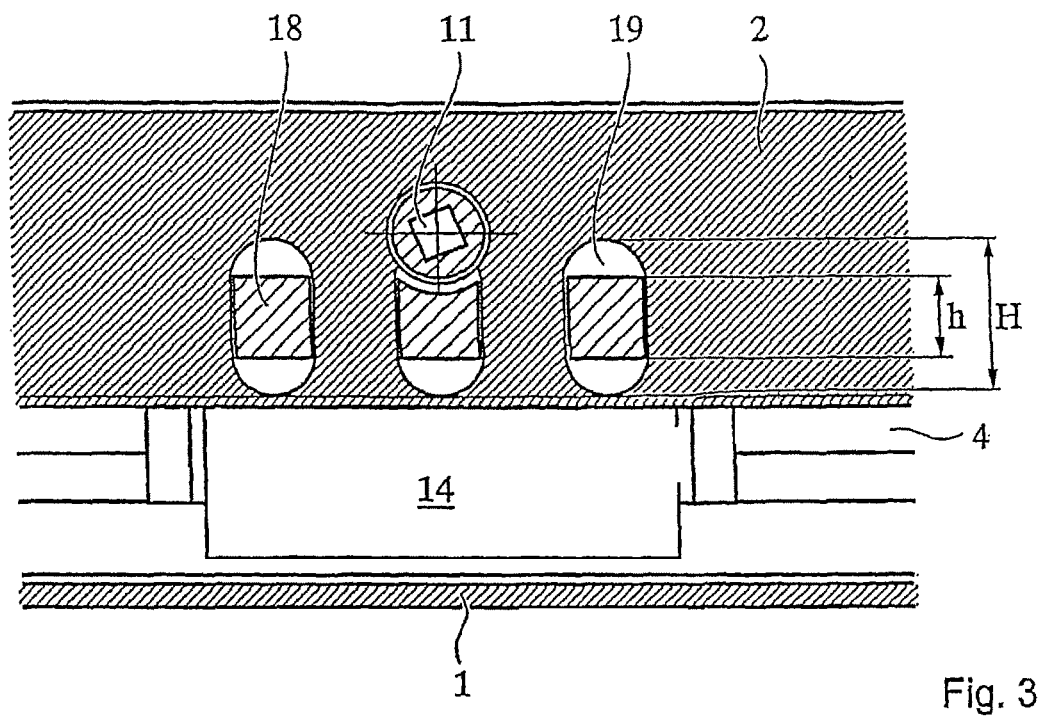
Figure 4:
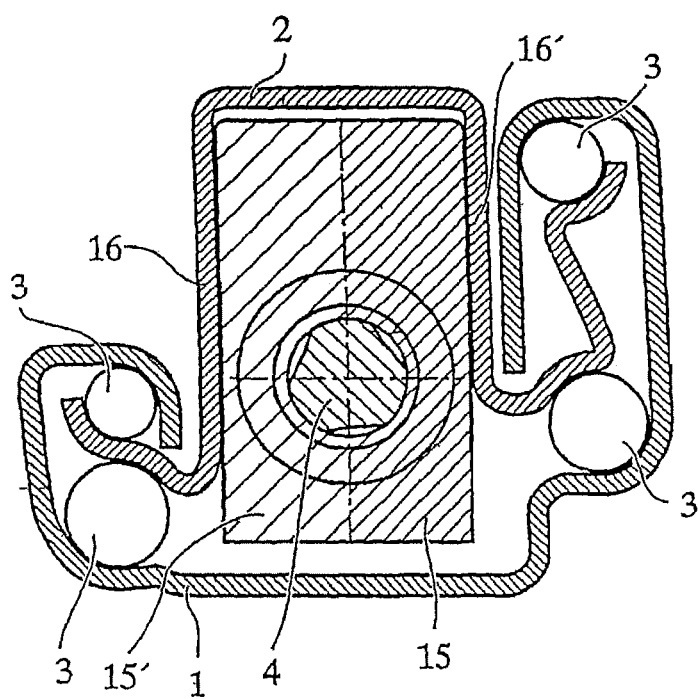
Figure 5:
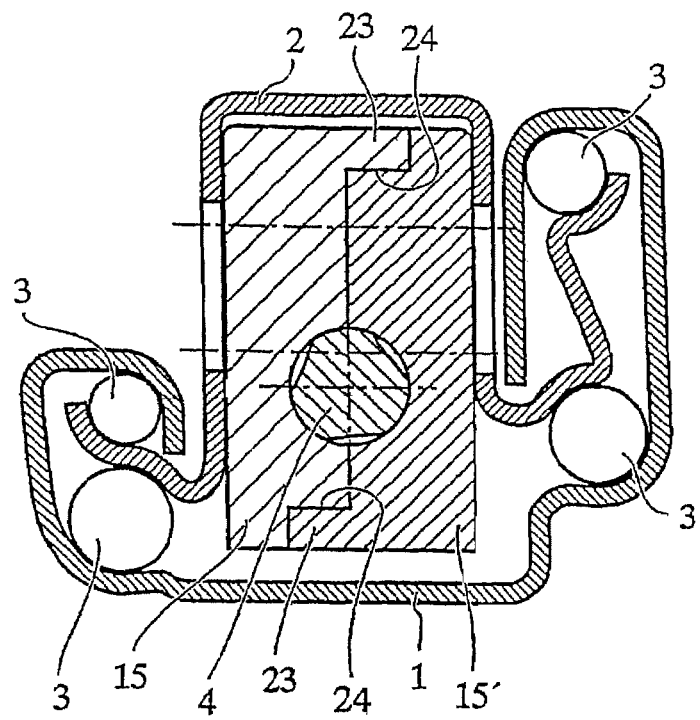
Figure 6:
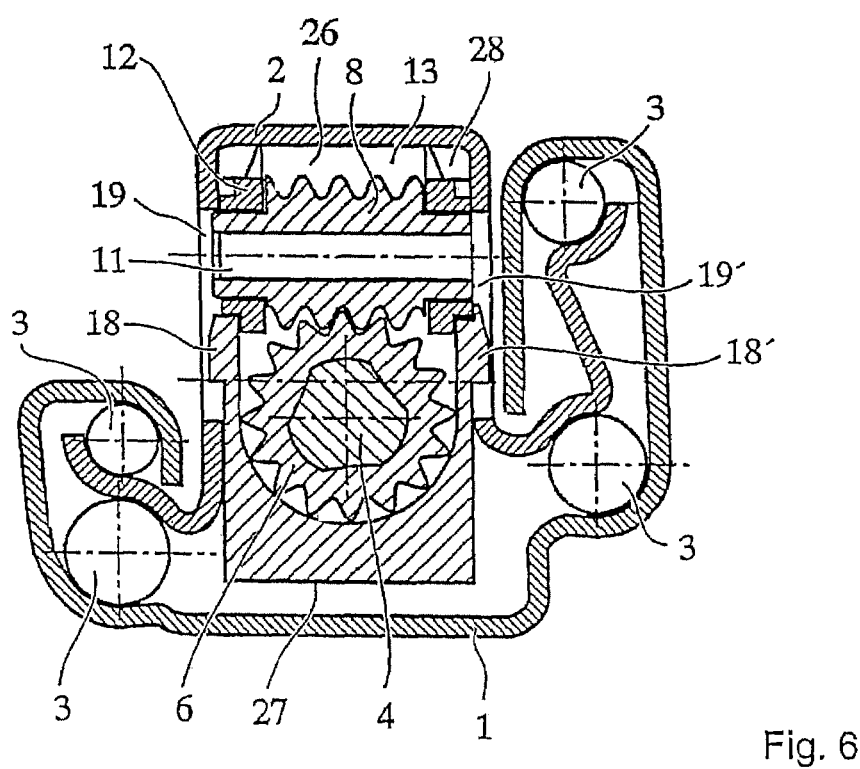
Figure 7:
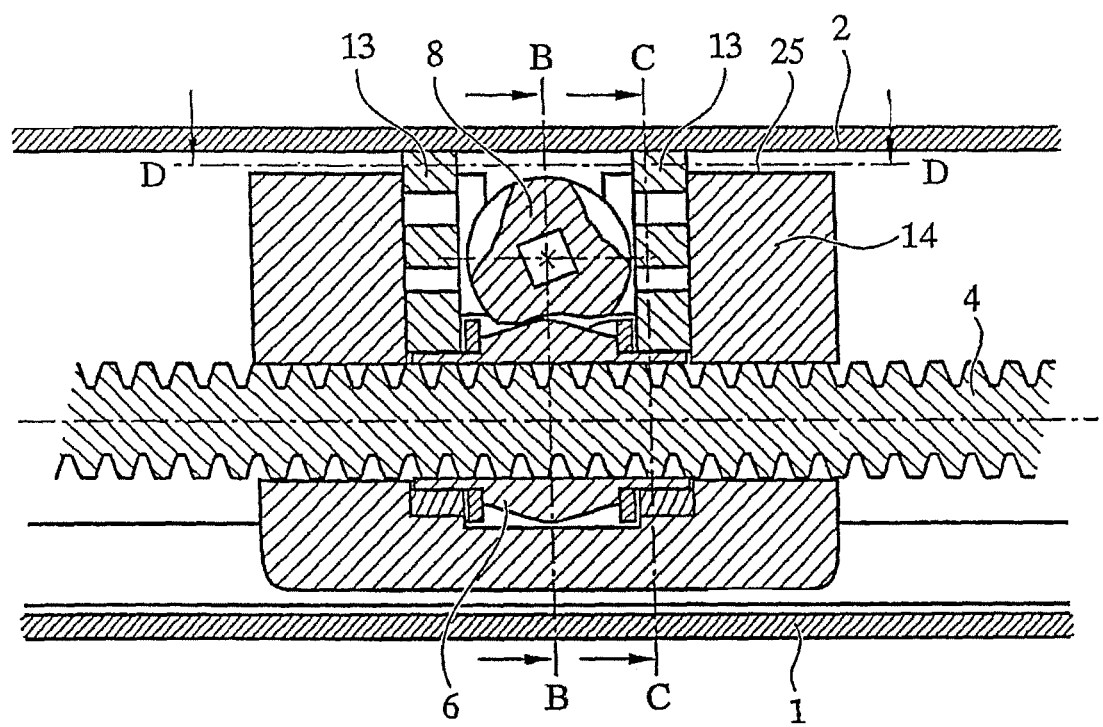
Figure 8:
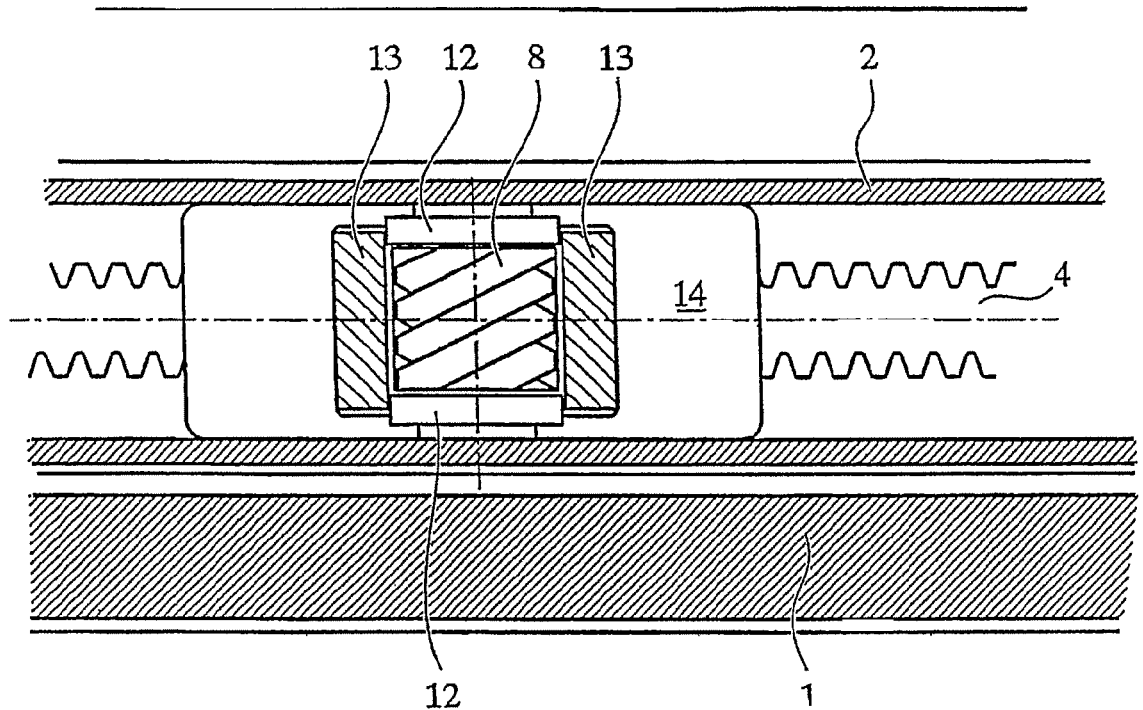
Figure 9:
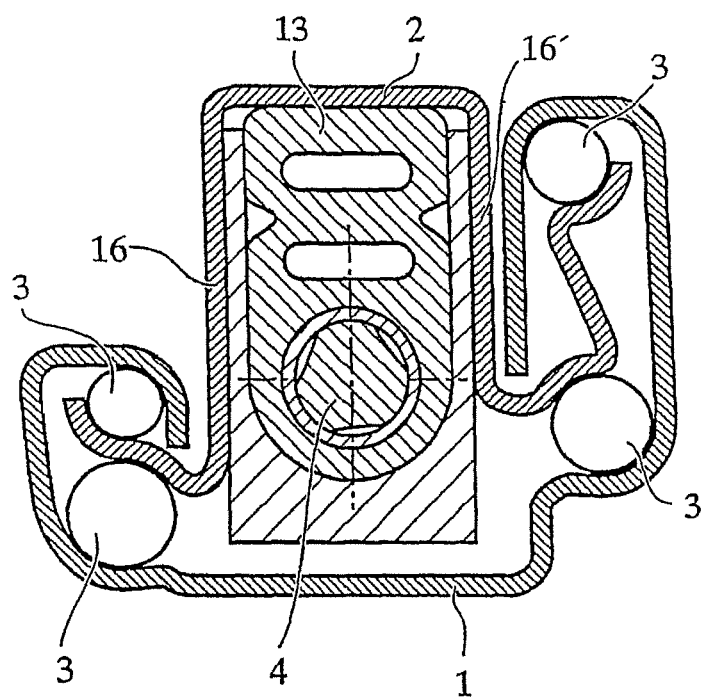

The figures illustrate various embodiments of the invention by way of example and schematically. In the figures:

FIG. 1 shows a central section B-B through a first adjusting device configured according to the invention, FIG. 2 shows a central longitudinal section through the adjusting device according to FIG. 1, FIG. 3 shows a lateral section E-E according to FIGS. 1 and 2, FIG. 4 shows a section C-C of the gear housing according to FIGS. 1 to 3, FIG. 5 shows a section D-D through another adjusting device according to the invention, FIG. 6 shows a central section (analogous to B-B) through another adjusting device according to the present invention, FIG. 7 shows a central longitudinal section through the adjusting device according to FIG. 6, FIG. 8 shows a section D-D through the gear housing according to FIGS. 6 and 7, FIG. 9 shows a section C-C through the adjusting device according to FIGS. 6 to 8.

The adjusting device illustrated in FIGS. 1 to 4 comprises a first lower rail 1, which can be screwed to the motor vehicle floor, and an upper rail 2, which is guided displacably in said lower rail and can be connected to the motor vehicle seat. Spherical rolling bodies 3, which reduce the displacement forces during the longitudinal adjustment of the motor vehicle seat in relation to the motor vehicle floor, are arranged in the regions in which lower rail 1 and upper rail 2, which is of U-shaped design in the central rail region, embrace.

A spindle 4, which extends in the longitudinal direction of the rail equidistantly to the lower side 5 of the lower rail 1, is arranged rigidly within the lower rail 1. A rotatable spindle nut 6, which is provided on its outside with a toothing 7, turns on the spindle 4. A driving worm 8 engages in said toothing 7, the axis of rotation 9 of which driving worm is rotated through 90° in relation to the longitudinal axis 10 of spindle 4 or spindle nut 6 and runs offset upward, i.e. in the direction of the upper rail 2. In its interior, the driving worm 8 has a square recess 11, into which the complementary output piece of a flexible drive shaft (not illustrated) of an electromotive drive can be inserted. The driving worm 8 can therefore be rotated either to the left or to the right by the electromotive drive, and causes rotation of the spindle nut 6. The worm drive ensures the desired step-down ratio and self-locking of the gear.

By rotation of the spindle nut 6, the latter is displaced in relation to the spindle 4 in the longitudinal direction of the rail. Spindle nut 6 and driving worm 8 are arranged rotatably by means of sliding bearings 12, 13 in a gear housing 14, which comprises two housing segments 15, 15' joined to each other in the region of the spindle leadthrough. The gear housing 14 essentially fills the U-shaped region of the upper rail 2 and, since the width of the gear housing 14 corresponds approximately to the clear width of the upper rail 2, is clamped between the limbs 16, 16' thereof with a slight prestress. This clamping force works against the housing segments 15, 15' falling apart.

Latching projections 18, 18', which are provided with entry slopes 17 and are formed integrally as a single piece, protrude from the gear housing 14 to both sides, engage with a form fit in latching openings 19, 19' of the upper rail 2 and serve to transmit shearing force between gear housing 14 and upper rail 2 in the longitudinal direction of the rail. The displacement force exerted by the spindle 4 on the spindle nut 6 is therefore transmitted by the gear housing 14 and by means of the described form fit to the upper rail 2, which is displaced in relation to the lower rail 1 upon rotation of the driving worm 8 and adjusts the motor vehicle seat into the desired longitudinal position.

The height h of the latching projections 18, 18' is lower than the height H of the associated latching opening 19, 19', and therefore the gear housing 14 can move upward or downward within the upper rail 2 in order to compensate for tolerances. For this purpose, the gear housing 14 is dimensioned in such a manner that it is spaced apart from lower rail 1 and upper rail 2 in the design position.

In the case of a motor vehicle seat without electric adjustment, the latching openings 19, 19, can be penetrated by a mechanically releasable bolt and can serve for the locking between lower rail 1 and upper rail 2. They are therefore provided as standard in this case and do not have to be introduced separately in order to carry out the invention.

The gear housing 14 is provided on the end side in the region of the spindle leadthrough with cylindrical pins 20, into each of which a radially encircling groove 21 is formed. A securing ring 22, which secures the housing segments 15, 15' in their position with respect to each other and permits a functional check of the gear before installation into the upper rail 2, is inserted into each groove 21.

With spindle 4 inserted, the gear housing 14 is inserted from below into the, if appropriate, temporarily elastically widened, U-shaped region of the upper rail 2 and is latched there before the latter is pushed into the lower rail 1. The spindle 4 is subsequently connected rigidly at both of its ends to the lower rail 1, for example by screwing or riveting.

To make it easier to orient the housing segments 15, 15' with respect to each other, the latter can be provided, as shown in FIG. 5, with projections 23, which project into the dividing plane and correspond with recesses 24 in the respectively other housing segment 15' 15. The two housing segments 15, 15' are preferably also formed with identical contours.

The gear housing 14 of the embodiment according to FIGS. 6 to 9 is designed as a single part. It has a shaft 26 which extends vertically downward from the upper side 25 of the gear housing 14 and has an essentially rectangular cross section, reaches in the manner of a blind hole virtually as far as the lower side 27 of the gear housing 14 and is penetrated laterally by the spindle 4. The sliding bearings 13 of the spindle nut 6 are of plate-like design and, during the assembly of the gear, are inserted together with the latter from above into the shaft 26 until the spindle nut 6 has taken up its design position. The driving worm 8 has been rotated previously together with its sliding bearings 12 through 90° in relation to the spindle nut 6, has likewise been arranged between the plate-like sliding bearings 13 and is upwardly secured by means of steps 28 on the sliding bearings 13. The plate-like sliding bearings 13, which can be manufactured from a plastic with a low coefficient of friction (e.g., polyoxymethylene or POM), reach in the design position as far as the upper rail, but are of spring-like design (see FIG. 9) and can therefore be elastically compressed upon a displacement of the gear housing upward. A compensation of tolerance is therefore likewise possible.

REFERENCE NUMBERS

1 Lower rail
2 Upper rail
3 Rolling body
4 Spindle
5 Lower side of the rail
6 Spindle nut
7 Toothing
8 Driving worm
9 Axis of rotation (of the driving worm)
10 Longitudinal axis (of the spindle or spindle nut)
11 Recess
12 Sliding bearing (of the driving worm)
13 Sliding bearing (of the spindle nut)
14 Gear housing
15 Housing segment
16 Limb
17 Entry slope
18 Latching projection
19 Latching opening
20 Pin
21 Groove
22 Securing ring
23 Projection 24 Recess
25 Upper side (of the gear housing)
26 Shaft
27 Lower side (of the gear housing)
28 Step

The invention claimed is:

1. An adjusting device for a seat of a motor vehicle, comprising:
 at least one first rail and one second rail, the second rail being configured to be displaceable in relation to the first rail;
 a spindle shaft arranged on the first rail;
 at least one gear element configured to act with the spindle shaft; and
 a gear housing fastened directly with a form fit to the second rail,
 wherein the gear housing is at least partially embedded in the second rail such that the gear housing is fixed with respect to a shearing force in a longitudinal axis of the second rail, the longitudinal axis running perpendicular to a vertical direction,
 wherein the second rail comprises at least one latching opening arranged on each of two mutually oppositely positioned limbs of the second rail,
 wherein the gear housing has a substantially vertical limb latching portion insertable into each of the latching openings arranged on the limbs of the second rail,
 wherein the gear housing is configured to be displaceable relative to the second rail in the vertical direction during displacement between the first and second rails along the longitudinal axis, and
 wherein the two limbs are arranged essentially parallel to each other.

2. The adjusting device of claim 1, wherein the spindle shaft is arranged on the first rail such that the spindle shaft is fixed with respect to rotation and shearing forces.

3. The adjusting device of claim 1, wherein the gear element is a spindle nut configured to be directly driven via a worm gear.

4. The adjusting device as claimed in claim 1, wherein the second rail comprises a plurality of latching openings that are spaced apart from one another in a longitudinal direction of the second rail, and wherein the gear housing comprises latching portions configured to be inserted into the plurality of latch openings.

5. The adjusting device of claim 1, wherein each of the two latching portions has an entry slope for facilitating insertion into the two latching openings, the entry slope being a plane inclined at a non-zero acute angle from a vertical plane.

6. The adjusting device of claim 1, wherein the gear housing is divided into housing segments which are defined by a division line, and wherein the division line is aligned to run through a retaining portion of the gear housing for the spindle shaft.

7. The adjusting device of claim 1, wherein the gear housing has a single piece construction, wherein the spindle shaft runs into a region of a retaining portion of the gear housing, and wherein the gear element is housed within the gear housing.

8. The adjusting device of claim 1, wherein heights of the two latching projections are smaller than heights of the two latching openings such that the gear housing is arranged to be displaced in the vertical direction.

9. The adjusting device of claim 1, wherein the substantially vertical limb latching portions of the gear housing is configured to be displaceable relative to the second rail in the vertical direction during displacement between the first and second rails along the longitudinal axis.

* * * * *